(12) United States Patent
Hagen et al.

(10) Patent No.: US 6,802,152 B2
(45) Date of Patent: Oct. 12, 2004

(54) MOLE TRAP

(75) Inventors: David Hagen, Meppen, IL (US);
Patrick Destefano, Jr., Fieldon, IL (US)

(73) Assignee: Mole Monster, Inc., Meppen, IL (US)

( * ) Notice: Subject to any disclaimer, the term of this patent is extended or adjusted under 35 U.S.C. 154(b) by 0 days.

(21) Appl. No.: 10/307,686

(22) Filed: Dec. 2, 2002

(65) Prior Publication Data

US 2004/0103578 A1 Jun. 3, 2004

(51) Int. Cl.⁷ .............................................. A01M 23/36
(52) U.S. Cl. ...................... 43/79; 43/78; 43/80; 43/84
(58) Field of Search ................................. 43/77, 78, 79, 43/80, 84

(56) References Cited

U.S. PATENT DOCUMENTS

| | | | |
|---|---|---|---|
| 331,483 A | * 12/1885 | Eddington | ...................... 43/80 |
| 631,790 A | * 8/1899 | Griffin | ........................... 43/80 |
| 1,102,049 A | * 6/1914 | Hollis | ............................ 43/80 |
| 2,148,813 A | * 2/1939 | Hosmer | ......................... 43/78 |
| 4,109,406 A | 8/1978 | Denninger | |
| D270,174 S | 8/1983 | Gaines | |
| 4,494,335 A | 1/1985 | Gaines | |
| 4,765,087 A | 8/1988 | Holtgrefe, Sr. | |
| 4,776,128 A | 10/1988 | Townsend | |
| 4,790,102 A | 12/1988 | McPherson | |
| 4,827,662 A | 5/1989 | Dahlman | |
| 4,858,373 A | * 8/1989 | Combs | ........................ 43/61 |
| 5,307,587 A | 5/1994 | Zeiger et al. | |
| 5,339,846 A | 8/1994 | Shelton et al. | |

* cited by examiner

*Primary Examiner*—Kurt Rowan
(74) *Attorney, Agent, or Firm*—Senniger Powers

(57) ABSTRACT

A trap for exterminating moles has a support adapted for placement on the ground to support the trap in an upright position generally above the ground. An impingement device is operatively connected to the support for motion relative to the support for capturing the mole. A barrel mounted on the support in a generally vertical position is adapted for slidably receiving a portion of the impingement device in a retracted position. An explosion chamber receives an explosive force and directs the explosive force generally downward against the portion of the impingement device received in the barrel to drive the impingement device rapidly downward to an extended position. A trigger mechanism triggers an explosion producing the explosive force.

19 Claims, 12 Drawing Sheets

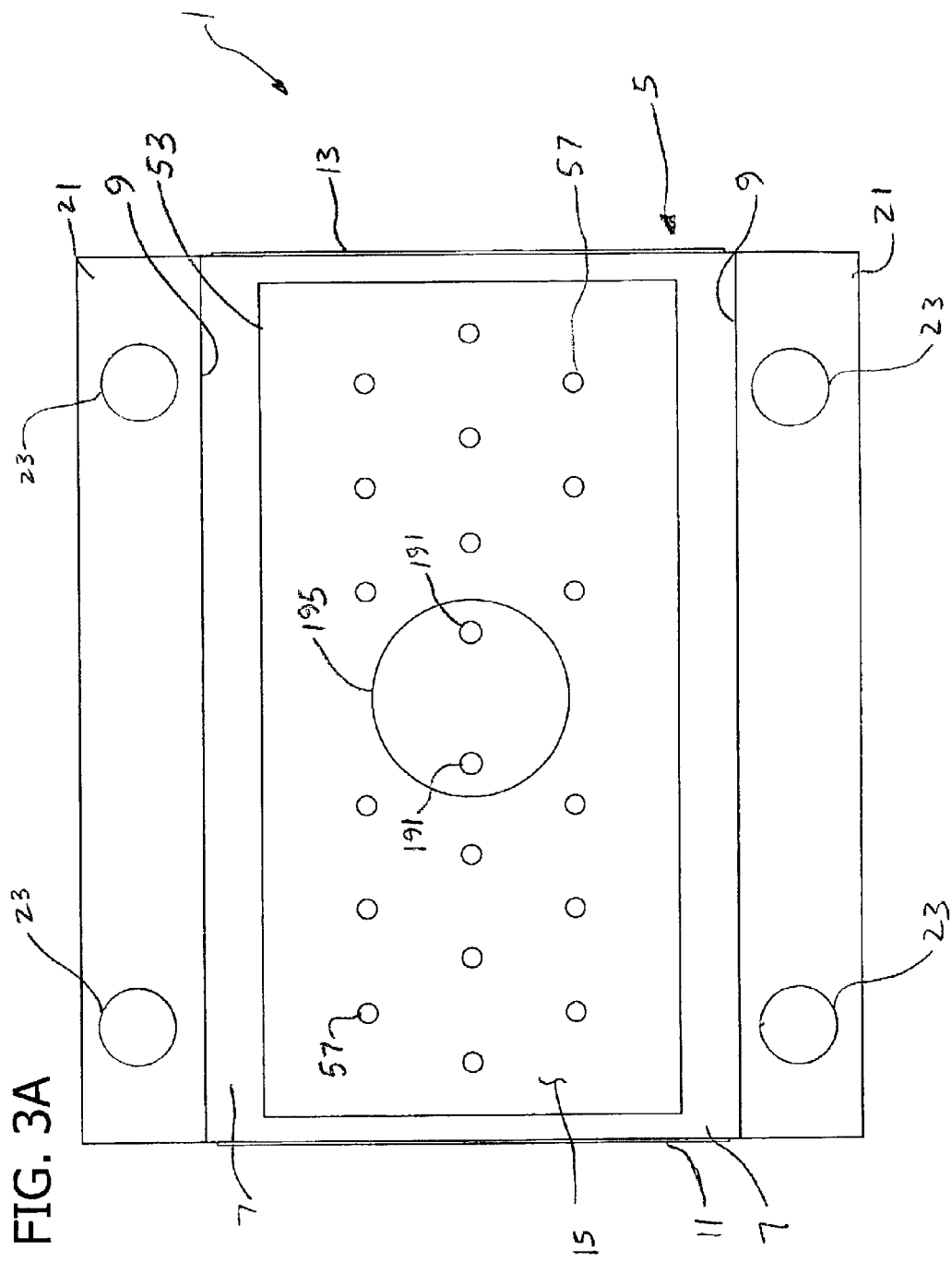

FIG. 4A
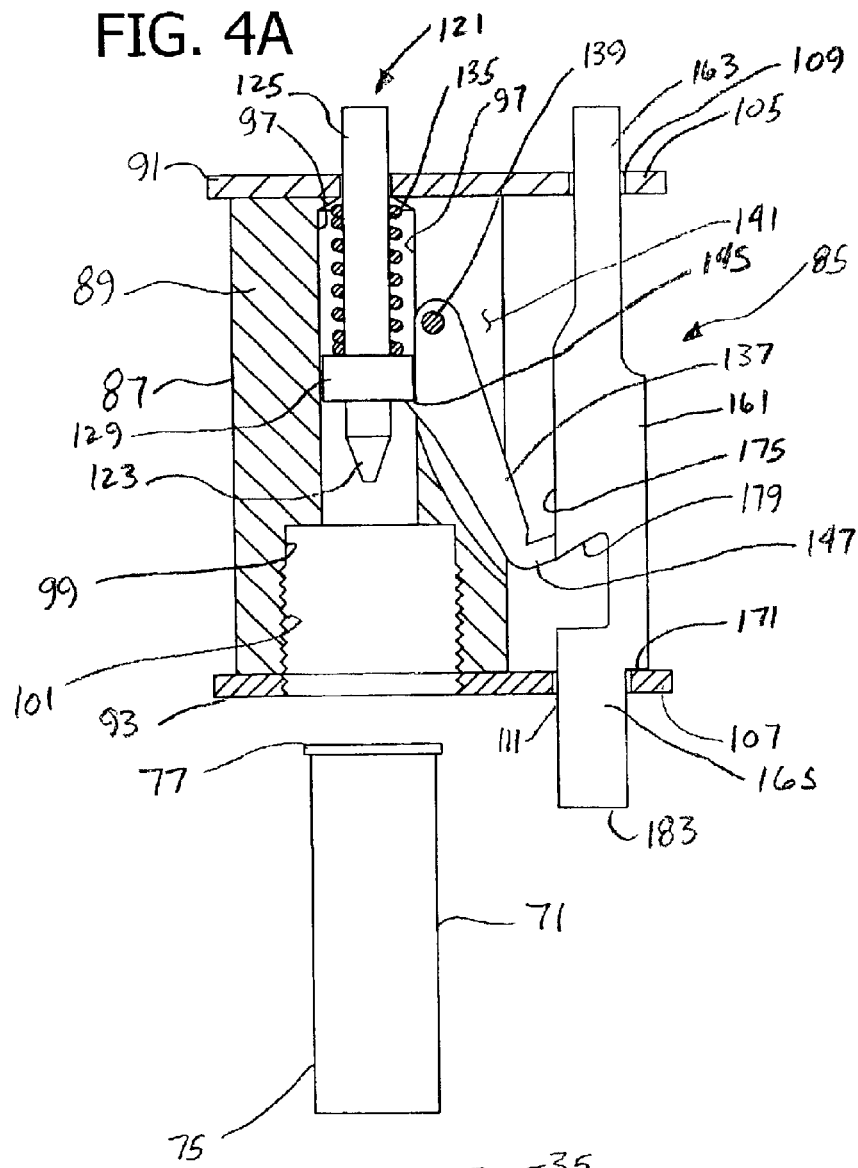
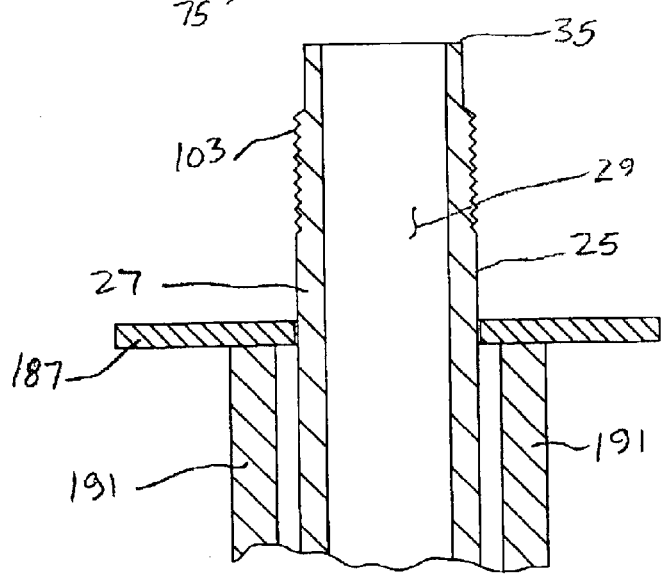

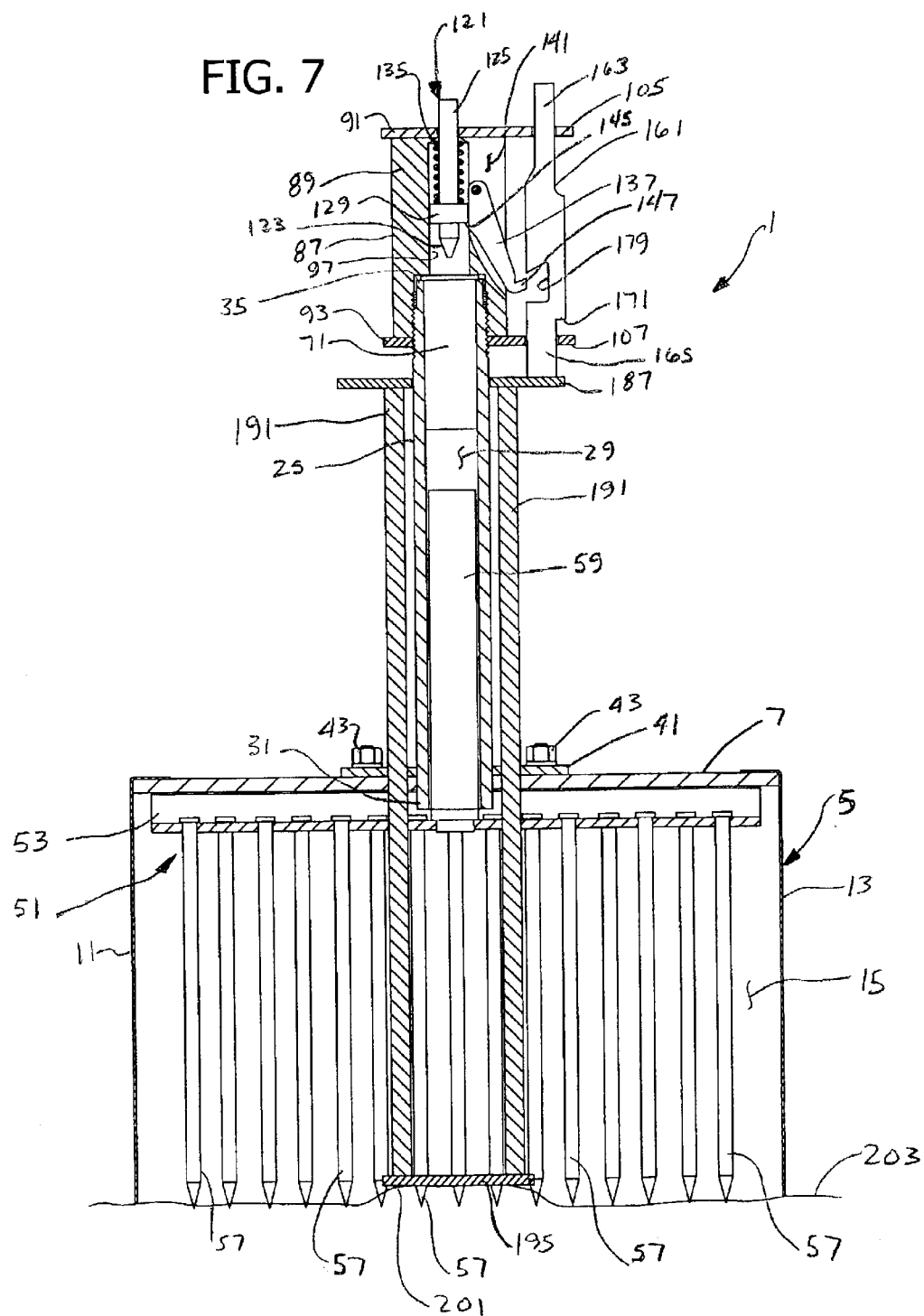

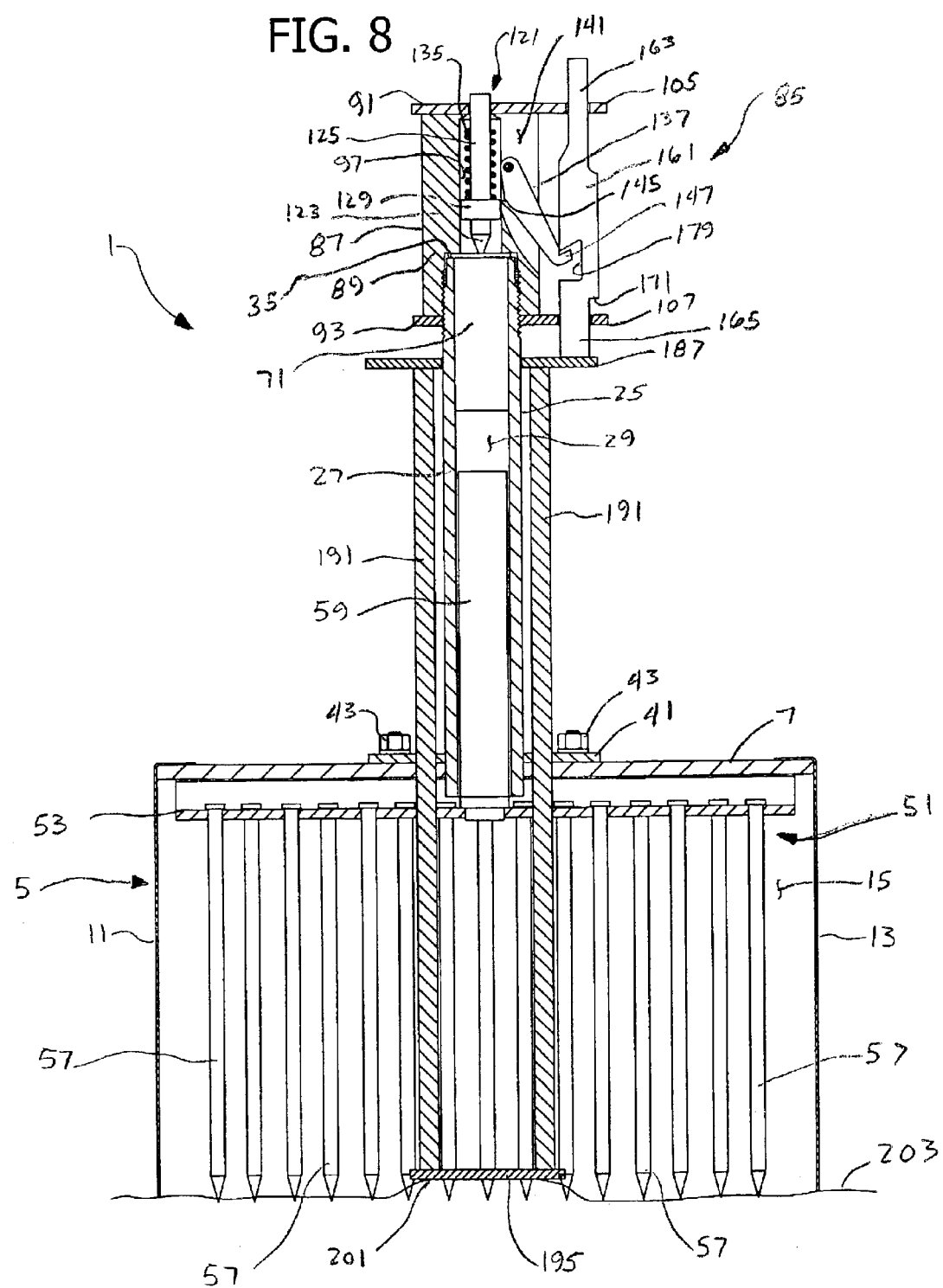

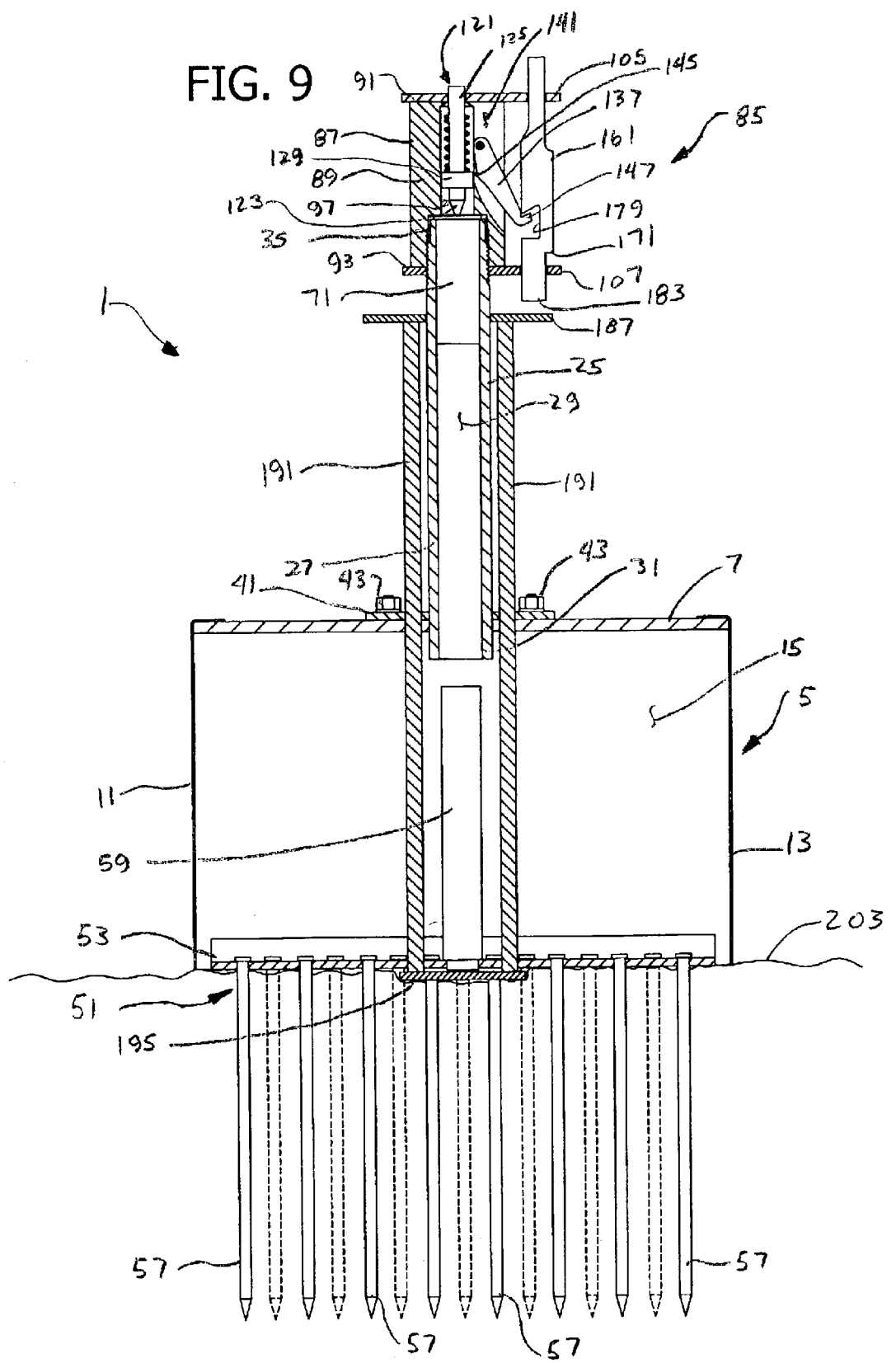

MOLE TRAP

BACKGROUND OF THE INVENTION

This invention relates generally to mole traps and more particularly to a mole trap having an explosive force for actuating an impingement device.

Moles are very robust animals that can survive in rather adverse conditions. Frequently, moles dig tunnels through lawns, golf courses, and carefully-tended gardens in search of their main food source, worms. Moles are extremely efficient diggers that can excavate 12–15 feet of tunnel per hour. Moles use their powerful front paws to claw at dirt and pack it on all sides to create an underground tunnel. Moles push excavated dirt from their tunnels up to the ground surface. The excavated dirt creates piles on the ground surface that can get larger than 2 feet in diameter (although most are 6 to 9 inches in diameter).

Damage resulting from mole tunnels include bare spots created by the piles of excavated dirt as well as the corresponding loss of structural integrity of the soil. Mole tunnels can undermine concrete slabs, driveways, pools, and even shallow foundations. Extensive mole tunnel networks can cause severe damage to a lawn requiring expensive repairs that can include tilling and replanting of an entire lawn.

Existing methods for exterminating moles include mole traps that are placed above the ground and are actuated to thrust sharp objects into the mole tunnel to impale the mole. These existing traps are generally ineffective in that they have low success rates for catching moles even after a mole has actuated the device. Some existing traps rely on spring loaded impingement devices that do not generate adequate force to effectively and quickly penetrate the ground to impale the mole. Also, existing traps rely on impingement devices that penetrate an inadequate section of the mole tunnel so that moles that actuate the trap are able to escape the impingement device.

SUMMARY OF INVENTION

Among the several objects and features of the present invention may be noted the provision of a mole trap which effectively exterminates a mole; the provision of such a mole trap which penetrates the mole tunnel with sufficient force to impale the mole; the provision of such a mole trap which is triggered to generate an explosive force; the provisions of such of mole trap which can prevent escape of the mole; the provision of such a mole trap which is fast-acting; and the provision of such a mole trap which penetrates a large volume of a mole tunnel.

Generally, the mole trap of the present invention comprises a support adapted for placement on the ground to support the trap in an upright position generally above the ground. An impingement device for capturing the mole is operatively connected to the support for motion relative to the support. A barrel is mounted on the support generally in a vertical position and is adapted for slidably receiving a portion of the impingement device in a retracted position. The barrel defines an explosion chamber for receiving an explosive force and directing the explosive force generally downward. The explosive force is directed against the portion of the impingement device received in the barrel to drive the impingement device downward to an extended position. A trigger mechanism triggers an explosion producing the explosive force.

In another aspect of the present invention, the mole trap of the present invention generally comprises an impingement device including a thrust plate and sharpened pins depending from the thrust plate in the upright position of the trap. The pins are arranged in an array of at least two rows with each row including a multiplicity of pins. The trigger mechanism triggers rapid movement of the impingement device into the ground for impaling the mole on one or more of the pins.

BRIEF DESCRIPTION OF THE DRAWINGS

FIG. 3A is a bottom view of the mole trap.

FIG. 4A is an exploded view of FIG. 4 showing an explosive device removed from the barrel of the mole trap.

FIG. 7 is a section of the mole trap showing the trigger mechanism in an actuated position.

FIG. 8 is a section of the mole trap showing a firing pin in a released position and in contact with the explosive device.

FIG. 9 is a section of the mole trap showing the impingement device in a fully extended position.

Corresponding reference characters indicate corresponding parts throughout the several views of the drawings.

DETAILED DESCRIPTION OF THE PREFERRED EMBODIMENTS

Figure 1:
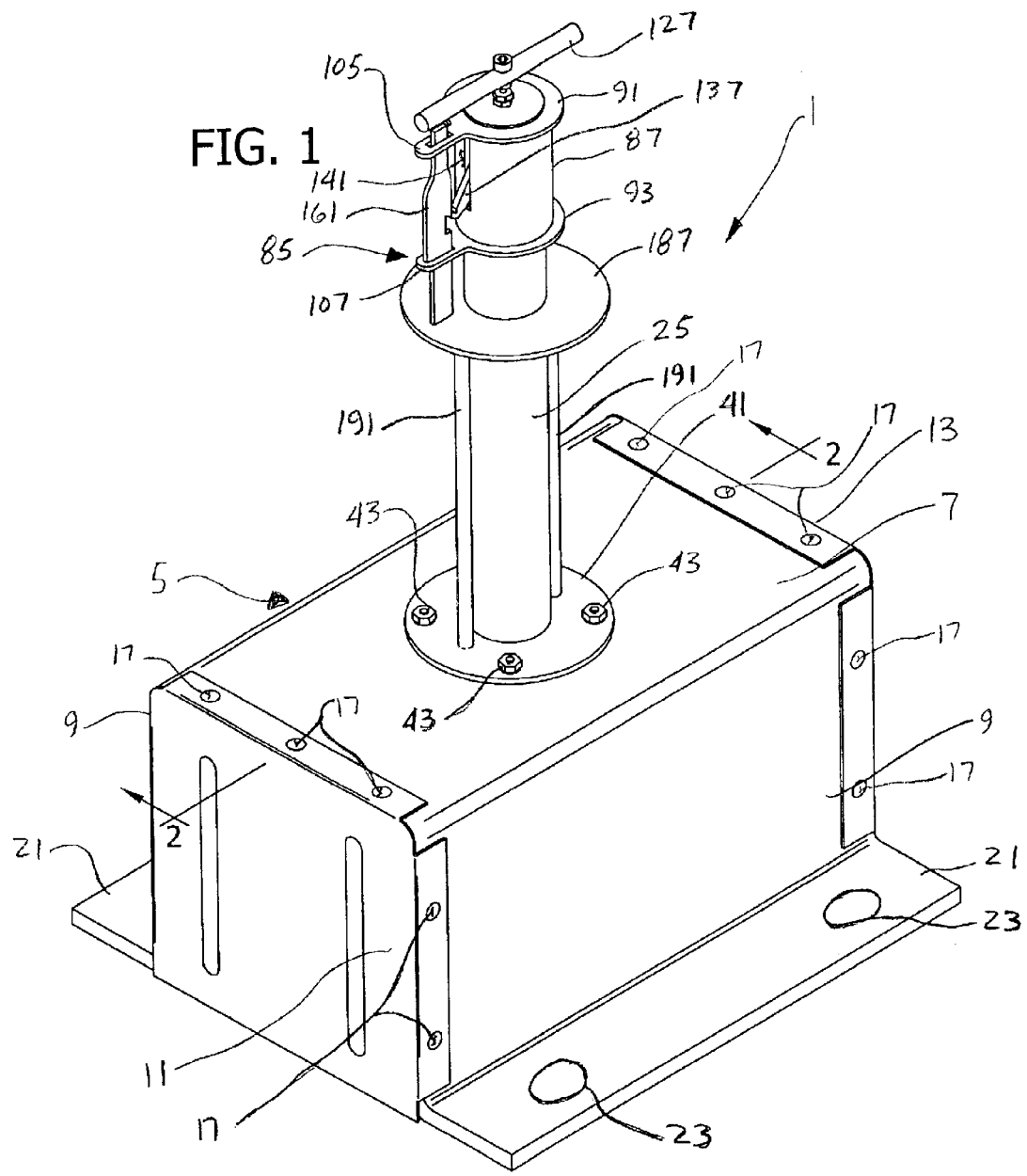
FIG. 1 is a perspective of a mole trap of the present invention.

Referring now to the drawings, and in particular FIG. 1, a mole trap of the present invention is generally indicated at 1. The mole trap 1 is used to exterminate moles by placing the trap on ground (i.e., lawns, golf course, gardens) where moles are expected to travel beneath the surface. The mole trap 1 is typically effective when placed over existing mole tunnels where moles are likely to frequent. As described in more detail below, the mole trap of the present invention provides effective extermination of moles tunneling below the trap.

Figure 2:
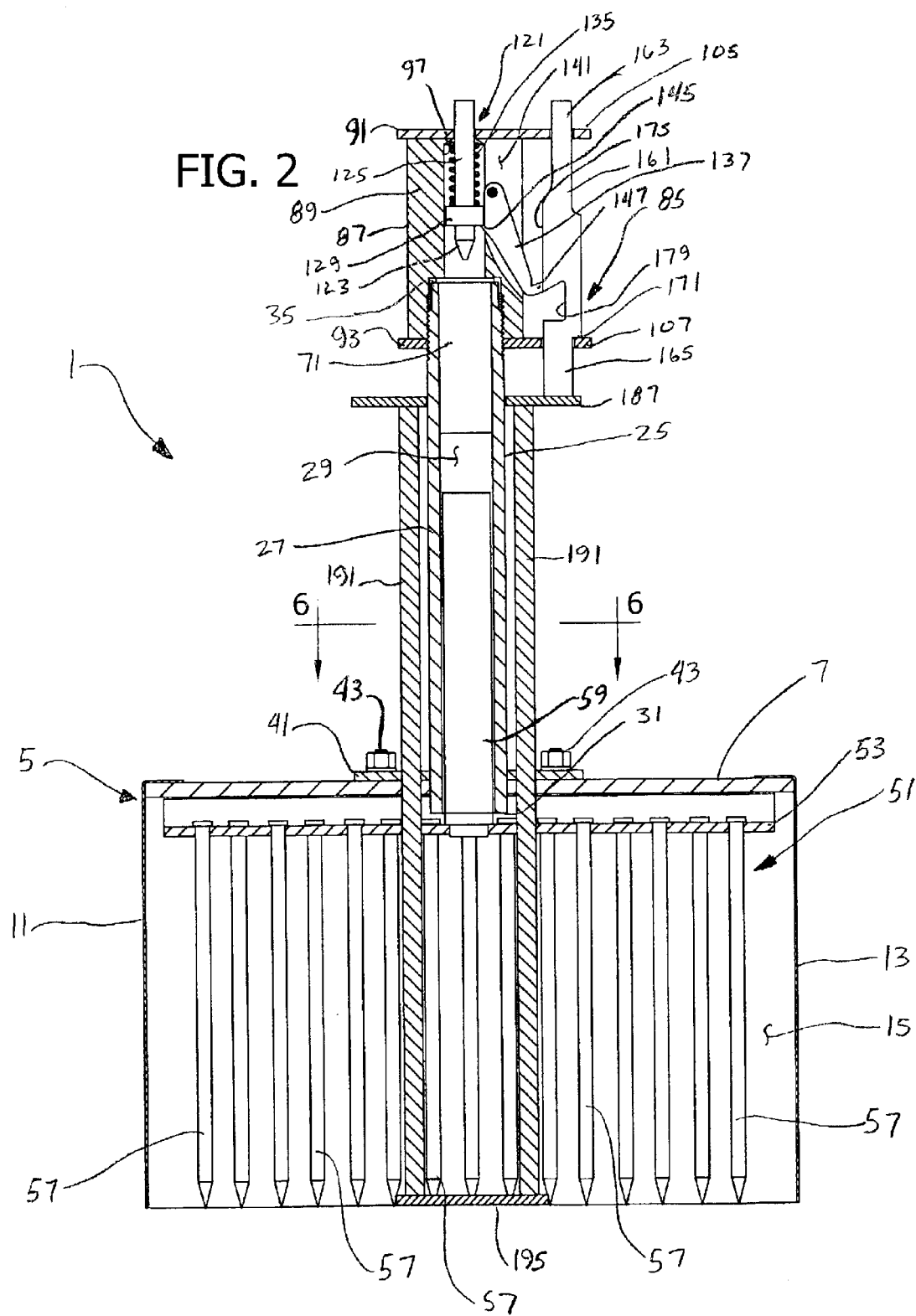
FIG. 2 is a section of the mole trap taken along the plane indicated by line 2—2 of FIG. 1.
Figure 3:
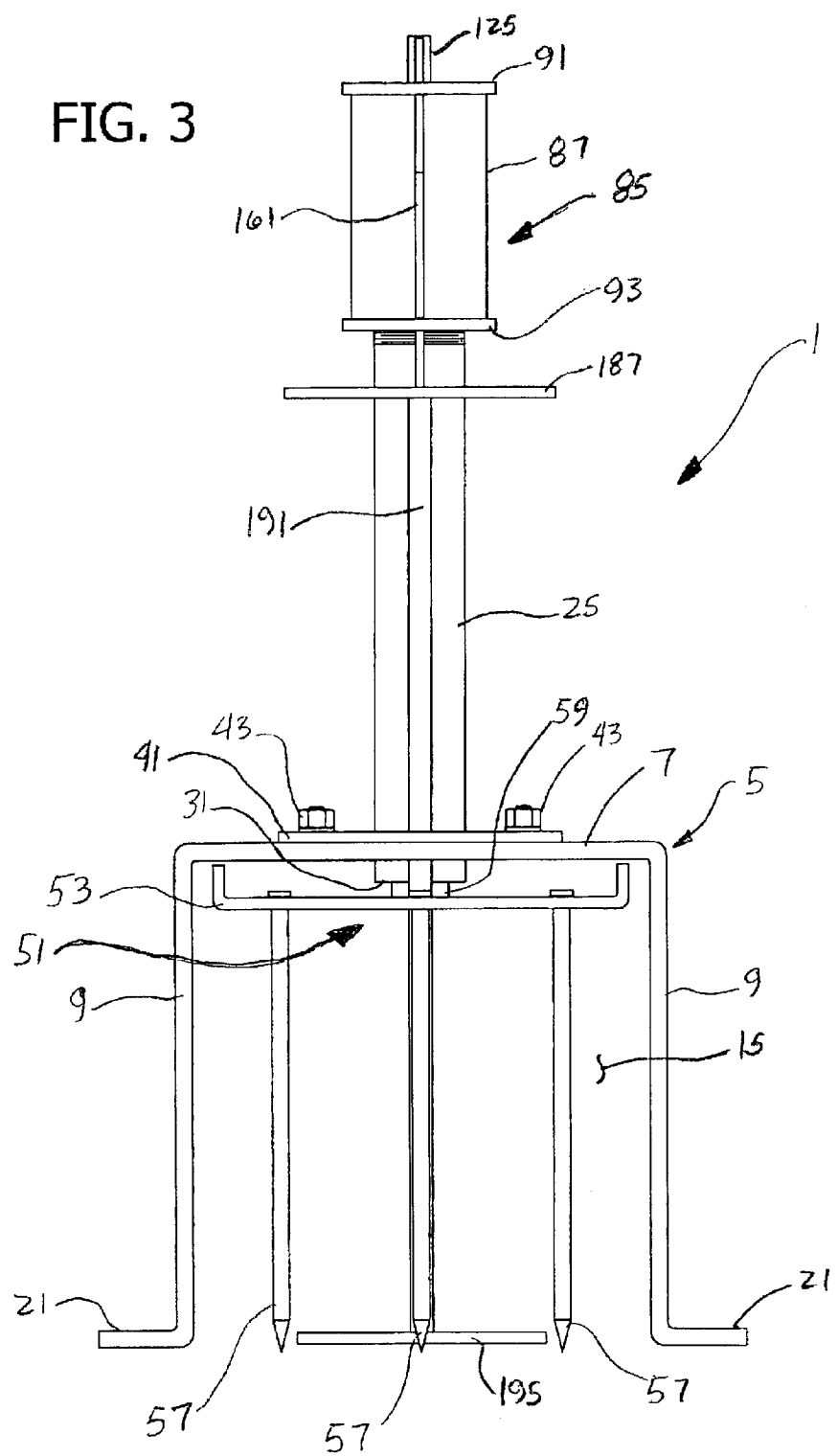
FIG. 3 is a front elevation with a front wall of a housing removed to show sharpened pins of an impingement device of the mole trap.

As shown in FIGS. 1–3, the trap comprises a support in the form of a housing, generally indicated at 5, comprising a top wall 7, two opposed side walls 9, a removable front wall 11 and a removable back wall 13 that together define an enclosed space 15. It will be understood that the front wall 11 and back wall 13 could be integral (i.e., non-removable) with the top wall 7 and side walls 9 to form the housing 5. The housing 5 allows the trap 1 to be placed on the ground in an upright position so that the side walls 9 straddle an existing mole tunnel passing below the trap generally from the front wall 11 to the back wall 13 of the housing. Placing the trap 1 in this manner increases the length and volume of the mole tunnel that can be penetrated by the trap resulting in a higher success rate of the trap. In the illustrated embodiment, the front wall 11 and back wall 13 have fastener holes 17 that are aligned with corresponding holes in the top wall 7 and side wall 9 so that threaded fasteners (not shown) may be used to secure the front and back walls to the trap 1. By removing the fasteners from the fastener holes 17, the front wall 11 and back wall 13 can be easily removed from the housing 5 to allow access to the enclosed space 15 for checking the positioning of the trap 1 or performing maintenance. It will be understood that other means for allowing access to enclosed space 15 can be provided such as providing a hinged connection on the front wall 11 or back wall 13 or mounting removable access doors on the housing 5. Also, the trap 1 may have an indicator (not shown) mounted to the housing 5 to provide external monitoring of the positioning of the trap. An integral flange 21 extends laterally from the bottom of each side wall 9 to contact the ground and help stabilize and maintain the trap 1 in an upright position. Each flange 21 has two spaced apart attachment holes 23 for receiving a stake (not shown) that can be inserted into the ground to prevent the trap from sliding along the surface of the ground. A barrel 25 mounted to the top wall 7 of the housing 5 extends up from the housing in a generally vertical position. The barrel 25 has a tubular body 27 defining an explosion chamber 29 with the body having a lower end 31 extending through an opening in the top wall 7 of the housing 5 and a threaded upper end 35. A mounting flange 41 is spaced above the lower end 31 of that barrel 25 to connect the barrel to the top wall 7 of the housing 5. In the illustrated embodiment, the mounting flange 41 is welded to the barrel body 27 and secured to the top wall 7 of the housing 5 via threaded fasteners 43, but it will be understood that other suitable forms of connection could be used (e.g., rivets).

As shown in FIGS. 2, 3, 3A and 5, the trap has an impingement device, generally indicated at 51, at least partially housed in the enclosed space 15. The impingement device includes a thrust plate 53 generally parallel with the top wall 7 of the housing 5 and a plurality of sharpened pins 57 depending from the thrust plate 53 for penetrating the ground and impaling the mole. A shaft 59 extends upward from the thrust plate 53 through the top wall 7 and is slidably received in the explosion chamber 29 of the barrel 25. As shown in FIG. 3A, the pins 57 are arranged in an array of three rows with each row having six pins. Preferably, the pins 57 are approximately six inches in length and approximately ³⁄₁₆ inch in diameter, however, it will be understood that other sizes and shapes of pins are contemplated by this invention. Also, varying quantities of pins 57 can be used and the pins may have alternative arrangements including unequal spacing between the pins or a random, non-linear organization. However, a sufficient number and arrangement of pins 57 is required to produce an adequate impingement area of the trap 1 to improve the opportunity of striking the mole when the trap is tripped.

Figure 4:
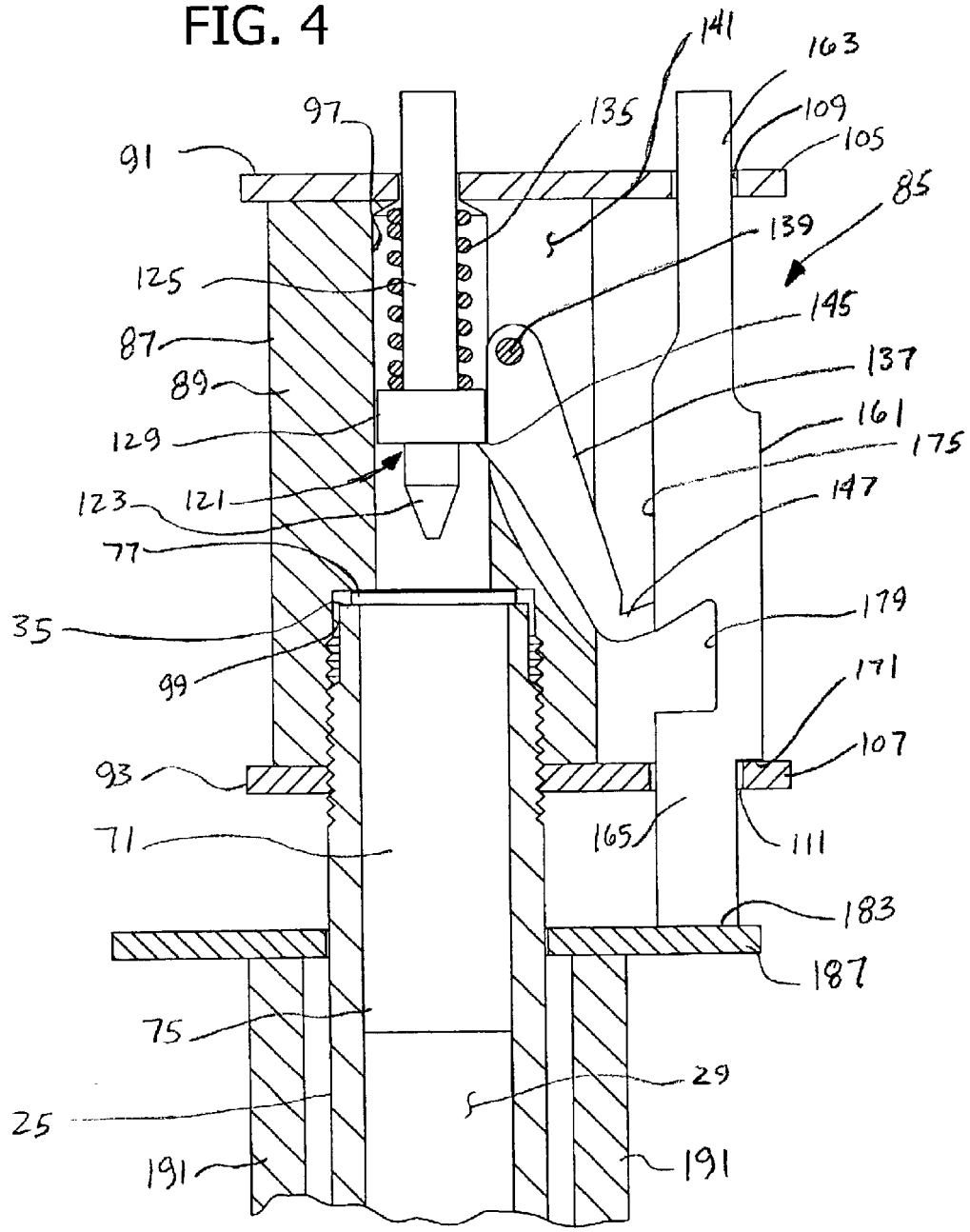
FIG. 4 is an enlarged fragmentary section showing a trigger mechanism and a top portion of a barrel of the mole trap.
Figure 5:
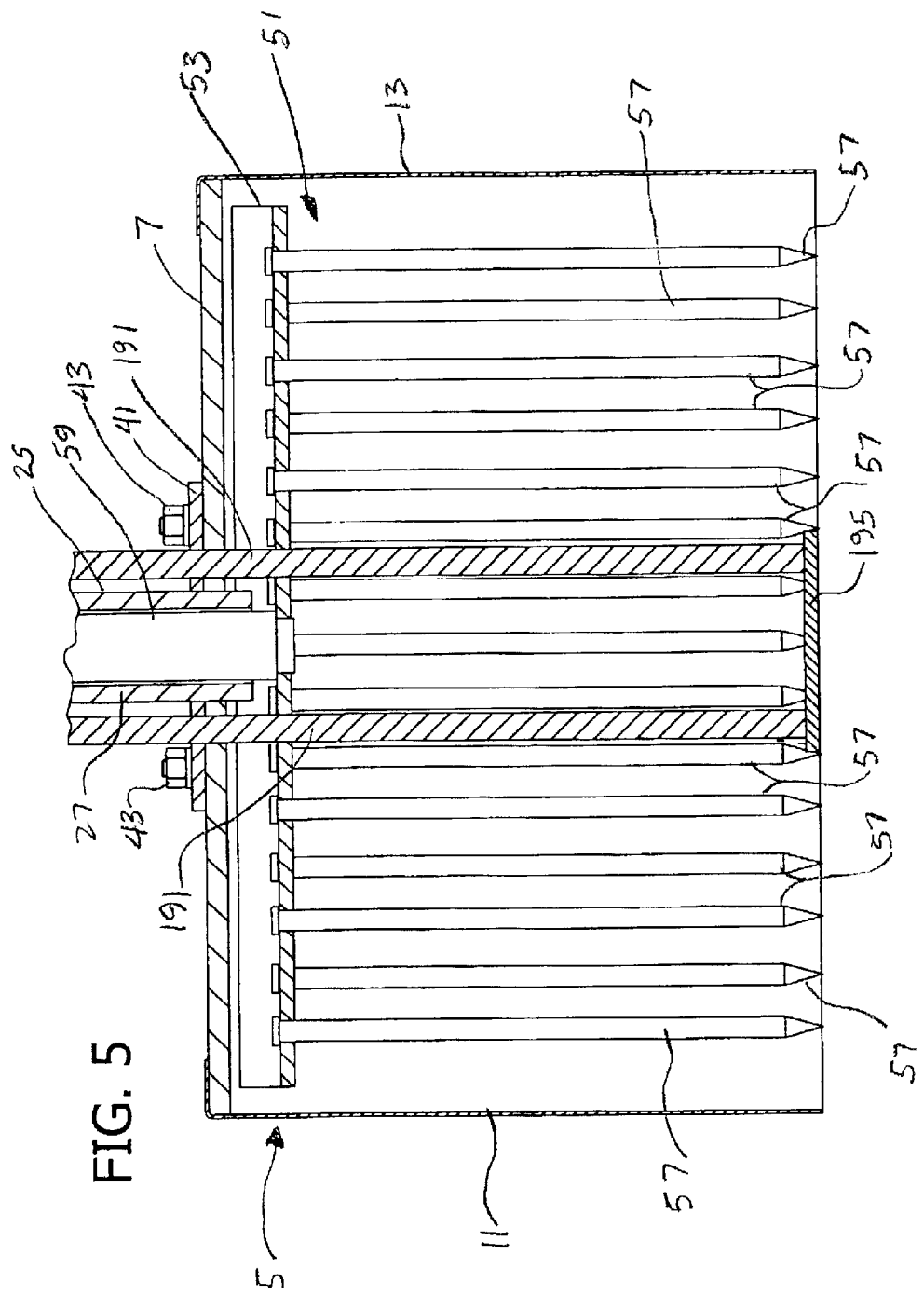
FIG. 5 is an enlarged fragmentary section showing the impingement device of the mole trap.
Figure 6:
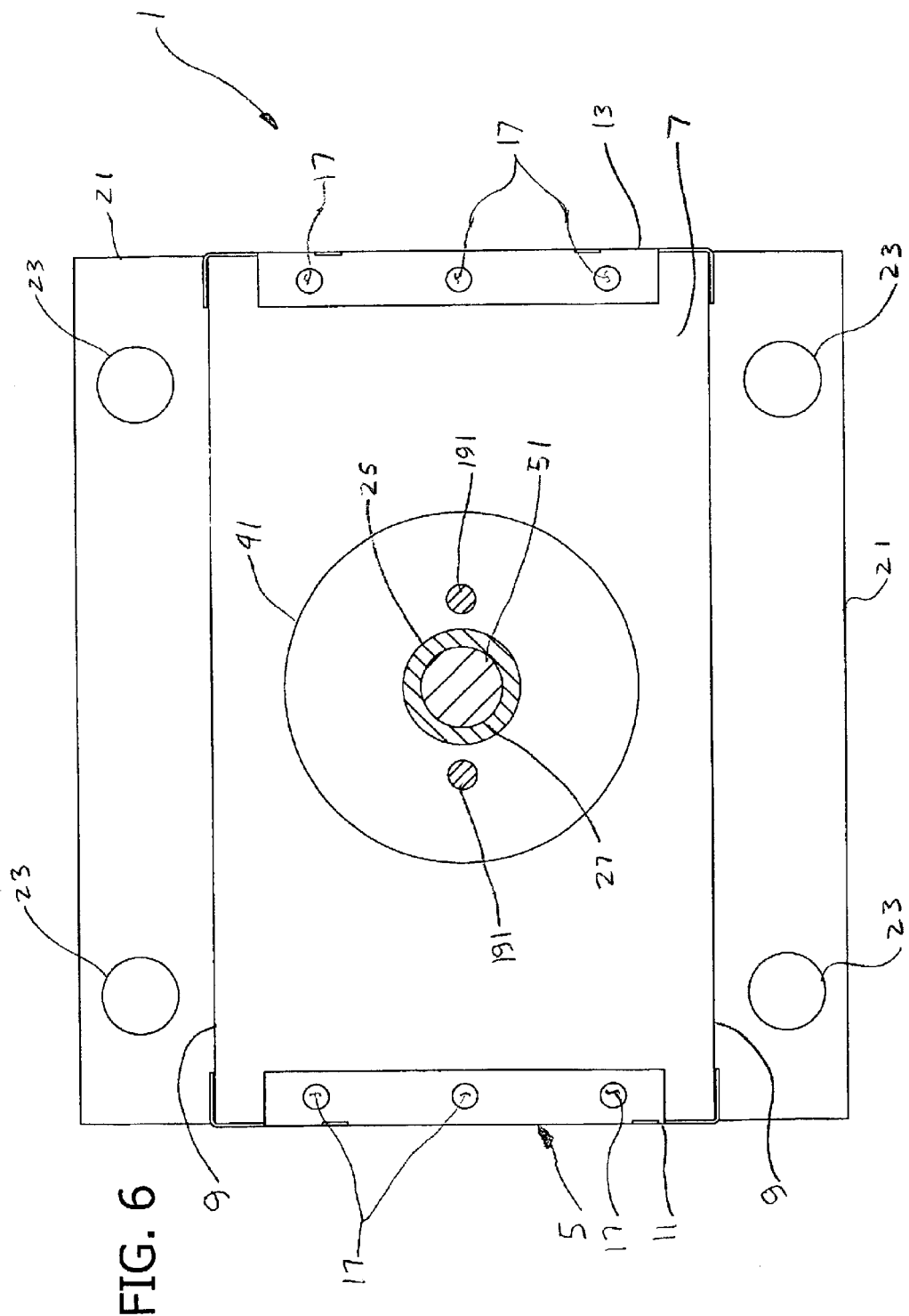
FIG. 6 is a section of the mole trap taken along the plane including line 6—6 of FIG. 2.

As shown in FIGS. 4 and 4A, an explosive device 71 is mounted on the upper end 35 of the barrel 25 and is housed in the explosion chamber 29. In the illustrated embodiment, the explosive device 71 is in the form of a modified shotgun shell having a cylindrical shell body 75 containing gun powder and a cap 77 at the top of the body. The cap 77 has a larger diameter than the shell body 75. The shell body 75 is sized to fit within explosion chamber 29 and the cap 77 is sized for engagement with the upper end 35 of the barrel 25 so that the explosive device is supported by the barrel body 27. It will be understood that the explosive device 71 may comprise a modified 20-gauge shotgun shell, a 0.38 caliber blank cartridge or other types of explosive devices. Also, the explosive device 71 may be of other sizes and geometric shapes (e.g., polygonal).

In the illustrated embodiment, the mole trap 1 has a trigger mechanism, generally indicated at 85, for triggering the explosive device 71. As best shown in FIGS. 4 and 4A, the trigger mechanism 85 includes a breech 87 having a generally cylindrical body 89 with top wall 91, a bottom wall 93, a side wall 95 and a central axial bore 97 having a larger diameter lower section 99 for receiving the upper end 35 of the barrel 25 and the explosive device 71. In the illustrated embodiment, the lower section 97 of the breech 87 has internal threads 101 for mating with the threaded upper end 35 of the barrel 25. The top wall 91 and bottom wall 93 extend laterally past the side wall 95 of the breach 87 to form upper and lower guides, 105 and 107 respectively. The upper guide 105 has an opening 109 axially aligned with and spaced above an opening 111 in the lower guide 107. A firing pin, generally designated 121, is slidable in the axial bore 97 and has a truncated conical head 123, an elongate body 125 extending upward from the base of the head through the top wall 91 of the breech 87 for connection to a handle 127 (FIG. 1), and a shoulder 129 spaced above the conical head and extending laterally from the elongate body. A spring 135 located in the axial bore 97 extends between the top wall 91 of the breech 87 and the shoulder 129 for driving the firing pin 121 rapidly downward. A sear 137 is hingedly attached to the breech 87 via a hinge pin 139 and is movable in a cavity 141 formed in the side wall 95 of the breech. The sear 137 has a lip 145 that protrudes into the central bore 97 of the breech 87 for engaging the shoulder 129 of the firing pin 121 and a lower foot 147 extending through the side wall 95 of the breech.

Figure 8A:
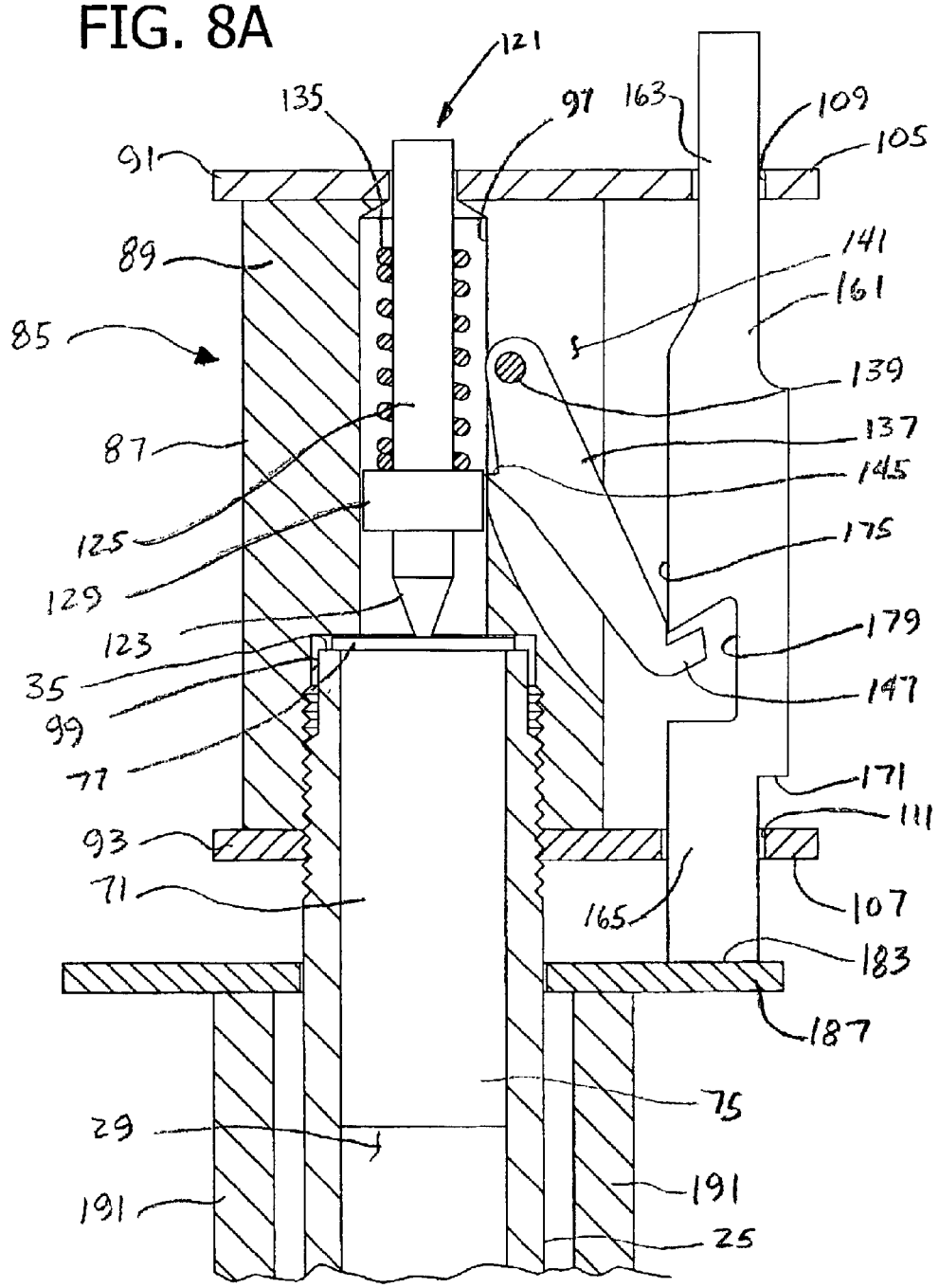
FIG. 8A is an enlarged fragmentary section of FIG. 8 showing the trigger mechanism and the top portion of the barrel of the mole trap.

As shown in FIG. 4, a trigger 161 is slidably attached to the breech 87 by having an upper portion 163 slidably received in the opening 109 in the upper guide 105 and a lower portion 165 slidably received in the opening 111 in the lower guide 107. In the illustrated embodiment, the trigger 161 is generally an elongate plate 169 having an intermediate stepped surface 171 for support against the lower guide 107, a generally flat inner surface 175 for slidable engagement with the lower foot 147 of the sear 137, a notch 179 below the flat inner surface and a flat lower end 183 that is supported by an actuator plate 187 spaced below the lower guide. The trigger 161 is slidable in a vertical direction in relation to the barrel body 27. As shown in FIG. 2, parallel supports 191 connected to the actuator plate 187 extend down through the barrel mounting flange 41, the top wall 7 of the housing 5 and the thrust plate 53. A ground plate 195 for sensing movement of the ground is attached to the lower ends of the parallel supports 191 and is generally surrounded by the sharpened pins 57 of the impingement device 51. The trigger 161, actuator plate 187, parallel supports 191, and ground plate 195 are all operatively connected and are movable in relation to the housing 5 and barrel 25 so that any upward force received by the ground plate causes the actuator plate to move correspondingly upward to actuate the trigger mechanism 85. As shown in FIGS. 8 and 8A, upward movement of the trigger 161 from the initial position shown in FIG. 4 causes the lower foot 147 of the sear 137 to disengage the inner surface 175 of the trigger so that the foot 147 is received in the notch 179 of the trigger 161 and the sear pivots outwardly. At the outwardly pivoted position, the lip 145 of the sear 137 is withdrawn from the central bore 97 of the breech 87 so that the firing pin 121 is thrust rapidly downward for contact with the explosive device 71.

In use, the mole trap 1 of the present invention is placed on the ground so that the housing 5, the sharpened pins 57, and the ground plate 195 engage the surface of the ground. As shown in FIG. 2, the trap 1 is first set to a position where the ground plate 195 is substantially parallel to the tips of the sharpened pins 57 and the inner surface 175 of the trigger 161 rests against the bottom foot 147 of the sear 137 so that the lip 145 of the sear holds the firing pin 121 in a raised position against the thrust force of the spring 135. As shown in FIG. 7, a mole tunnel creates a mound of raised earth 201 that protrudes upward from the otherwise flat ground surface 203. As a mole moves beneath the trap 1, the raised earth 201 contacts the ground plate 195 forcing the ground plate and actuator plate 187 (connected via parallel supports 191) to move upward. As shown in FIGS. 8 and 8A, the upward movement of the actuator plate 187 causes the trigger 161 to move upward so that the bottom foot 147 of the sear 137 slides along the inner surface 175 of the trigger 161 and into the notch 179 allowing the sear to pivot outward so that the lip 145 disengages the shoulder 129 of the firing pin 121. After the sear 137 disengages the firing pin 121, the pin is released and thrust downward by the driving force of the spring 135 so that the pin impacts the cap 77 of the explosive device 71 in the explosion chamber 29. The impact of the firing pin 121 with the explosive device 71 creates an explosion which generates a downward force acting against the shaft 59 of the impingement device 51. As shown in FIG. 9, the force acting on the shaft 59 thrusts the impingement device 51 rapidly downward such that the thrust plate 53 contacts the surface of the ground 203 and the sharpened pins 57 penetrate the ground to impale the mole that has tunneled beneath the trap 1 and actuated the trigger mechanism 85. The downward force generated by the explosion and resulting thrust of the impingement device 51 occurs rapidly and forcefully so the mole has insufficient time to retreat in the tunnel and escape contact with the sharpened pins 57. Also, the effectiveness of the trap is increased by the arrangement of the sharpened pins 57 which penetrate a long section of the mole tunnel thus reducing the chance that the mole would have enough space in the mole tunnel to avoid the sharpened pins.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A trap for use in exterminating moles comprising:
   a support adapted for placement on the ground to support the trap in an upright position generally above the ground;
   an impingement device operatively connected to the support for motion relative to the support for capturing the mole;
   a barrel mounted on the support in a generally vertical position when the trap is in the upright position, the barrel being adapted for slidably receiving a portion of the impingement device in a retracted position of the impingement device, the barrel defining an explosion chamber for receiving an explosive force and directing the explosive force generally downward against the portion of the impingement device received in the barrel to drive the impingement device rapidly downward to an extended position;
   a trigger mechanism for triggering an explosion producing said explosive force.

2. The trap as set forth in claim 1 wherein said impingement device comprises a thrust plate and a plurality of sharpened pine depending from the thrust plate.

3. The trap as set forth in claim 2 wherein said sharpened pins are arranged in an array of at least two rows with each row including a multiplicity of pins.

4. The trap as set forth in claim 2 wherein said impingement device comprises a shaft secured to the thrust plate, said shaft adapted for being slidably received in said barrel.

5. The trap as set forth in claim 1 further comprising an explosive device housed in said explosion chamber for generating said explosive force.

6. The trap as set forth in claim 5 wherein said explosive device is a modified shotgun shell.

7. The trap as set forth in claim 1 wherein said trigger mechanism comprises a ground plate for sensing movement of the ground and an actuator in communication with the ground plate.

8. The trap as set forth in claim 7 wherein said trigger mechanism further comprises a breech mounted on said barrel to enclose the explosion chamber defined by the barrel, said breech having a central bore axially aligned with the barrel.

9. The trap as set forth in claim 8 wherein said trigger mechanism further comprises a trigger movably attached to said breech in communication with said actuator and a sear hingedly attached to the breech having a first end at least partially protruding into the central bore and a second end in communication with the trigger.

10. The trap as set forth in claim 9 wherein said trigger mechanism further comprises a firing pin housed in the central bore and movable therein for communication with said first end of the sear and a resilient element in the central bore axially aligned with said firing pin for thrusting the firing pin towards said explosion chamber.

11. The trap as set forth in claim 1 wherein said support comprises a housing having spaced apart side walls, a front wall, a back wall and a top wall joining said side, front and back walls.

12. A trap for use in exterminating moles comprising:
    a support adapted for placement on the ground to support the trap in an upright position generally above the ground;
    an impingement device operatively connected to the support for motion relative to the support to capture the mole, the impingement device including a thrust plate and sharpened pins depending from the thrust plate in the upright position of the trap, the pins being arranged in an array of at least two rows, each row including a multiplicity of the pins;
    a trigger mechanism for triggering rapid movement of the impingement device relative to the support for impaling the mole on one or more of the pins arranged in said array; and
    an explosive device housed in an explosion chamber arranged with respect to the trigger mechanism for generating an explosive force causing said rapid movement of the impingement device.

13. The trap as set forth in claim 12 wherein said explosive device is a modified shotgun shell.

14. The trap as set forth in claim 12 wherein said impingement device comprises a shaft secured to the thrust plate, said shaft adapted for being slidable relative to the support.

15. The trap as set forth in claim 12 wherein said trigger mechanism comprises a ground plate for sensing movement of the ground and an actuator in communication with the ground plate.

16. The trap as set forth in claim 15 wherein said trigger mechanism further comprises a breech mounted on said support to enclose the explosion chamber, said breech having a central bore axially aligned with the support.

17. The trap as set forth in claim 16 wherein said trigger mechanism further comprises a trigger movably attached to said breech and in communication with said actuator and a sear hingedly attached to the breech and in communication with the trigger.

18. The trap as set forth in claim 17 wherein said trigger mechanism further comprises a firing pin housed in the central bore and movable therein for communication with said sear and a resilient element in the central bore axially aligned with said firing pin for biasing the firing pin towards said explosion chamber.

19. The trap as set forth in claim 12 wherein said support comprises a housing having spaced apart side walls, a front wall, a back wall and a top wall joining said side, front and back walls.

* * * * *